United States Patent Office 3,308,100
Patented Mar. 7, 1967

3,308,100
PREPARATION OF NOVEL POLYMERS
Edwards S. Rothman, Philadelphia, Pa., assignor to the United States of America as represented by the Secretary of Agriculture
No Drawing. Filed Dec. 6, 1963, Ser. No. 328,762
3 Claims. (Cl. 260—78)

A nonexclusive, irrevocable, royalty-free license in the invention herein described, throughout the world for all purposes of the United States Government, with the power to grant sublicenses for such purposes, is hereby granted to the Government of the United States of America.

This invention relates to polymeric compositions. More particularly, this invention relates to a process in which a diisopropenyl ester is condensed with a compound having two or more reactive hydrogen atoms, acetone is formed as a byproduct and separated from the polymer product. Depending upon the nature of the compound condensed with the diisopropenyl ester and upon the polymerization conditions employed, a wide variety of polymers are obtained. The products range from gum-like polymers, useful as adhesives, to fillers and surface coatings useful in paper making and in finishing textiles and leathers.

The diisopropenyl ester starting materials for making the polymers of the present invention are obtained by the process disclosed in copending application by Edward S. Rothman, Samuel Serota, and Daniel Swern, Serial No. 328,434, filed December 6, 1963.

According to the present invention novel polymeric compositions are obtained by a process comprising combining a diisopropenyl ester of a saturated aliphatic dicarboxylic acid with a compound having at least two reactive hydrogen atoms and heating in the presence of catalytic amounts of an acid until formation of acetone is substantially complete to produce a polymeric composition.

Some typical reactants and the compositions obtained from the present process are illustrated in the following equations:

(I)
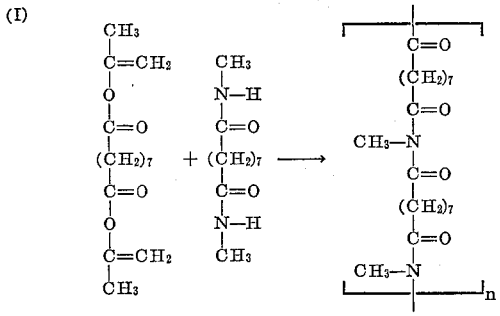

(II)
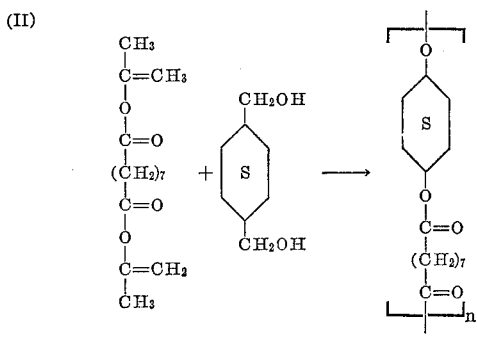

(III)
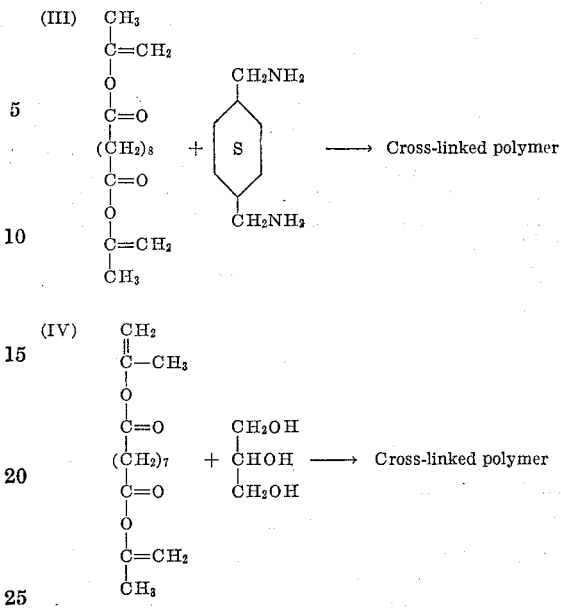

(IV)

$$\begin{array}{l} CH_2 \\ \| \\ C-CH_3 \\ | \\ O \\ | \\ C=O \\ | \\ (CH_2)_7 \\ | \\ C=O \\ | \\ O \\ | \\ C=CH_2 \\ | \\ CH_3 \end{array} + \begin{array}{l} CH_2OH \\ | \\ CHOH \\ | \\ CH_2OH \end{array} \longrightarrow \text{Cross-linked polymer}$$

While the process is considered applicable to a wide range of isopropenyl esters of dicarboxylic acids, preferred esters are the diisopropenyl esters of saturated aliphatic dicarboxylic acids having from 5 to 10 carbon atoms, such as glutaric, adipic, pimelic, suberic, azelaic, and sebacic acids.

The reaction to form polymers proceeds with compounds having at least two reactive hydrogen atoms, such as an N,N'-dialkylated amide, a di- or poly-hydroxy compound, a mono-, di-, or poly-amine, and compounds containing at least one each of a hydroxyl and an amino function.

The primary amides, such as $RCOONH_2$, are not operative in the process to produce desired polymers, as the active hydrogens are lost by splitting out as $H_2O$ under the reaction conditions, forming unreactive nitriles.

In the condensation reaction bubbles of gaseous acetone are evolved and the course of the reaction may be followed by this means. Completion of reaction is signalled by cessation of bubbling, although "curing," i.e. further heating, may increase the degree of polymerization when acetone emission is so slight as to make observation of the last traces of bubbling difficult. Application of vacuum in the curing stages is often beneficial in obtaining higher molecular weight products where desired.

The reaction is carried out by melting together the components with the catalyst, typically in the absence of solvent, although inert high boiling solvents may be utilized if desired.

It is desirable to have equal proportions of reactive groups provided by the diisopropenyl ester and reactive hydrogen compound. Thus, in reacting a diisopropenyl ester with a diol, equimolar amounts should be used.

In reacting diisopropenyl ester with glycerine, three molecules of diester (six ester functional groups) are equivalent to two molecules of glycerine (six hydroxyl groups). In the reaction illustrated in Example 5, diisopropenyl sebacate (two functional groups) was combined with the bisamine (four reactive hydrogens) in a two to one molar ratio. The ratio of one functional isopropenyl ester group per one functional group of reactive hydrogen provides the optimum condition for obtaining maximum molecular weight compositions. Of course, if polymers of different molecular weight are desired, the ratio of reactants can be varied.

The heating necessary to promote the reaction varies with the particular reactants combined. Liquids and low melting solids may react, as in Example 5, at about 100° C., copious evolution of acetone occurring at about 114° C. Other combinations of reactants may require heating to about 200° C. for efficient operation of the process. Above 200° C. there is a competing reaction in which diisopropyl esters self-polymerize. Accordingly, the amount of heating is conveniently stipulated as that necessary to initiate the reaction as indicated by liberation of acetone, but preferably less than about 200° C.

Typically, the reaction proceeds in the presence of an acid catalyst, with only trace amounts, i.e., up to about 0.5% by weight of reactants, sufficing for this purpose. Preferred catalysts are p-toluenesulfonic and methanesulfonic acids, but other acidic materials for this purpose are well known. When the polymerizing reactants are per se slightly acidic it is not necessary to add more acid.

The following examples illustrate some of the combinations of reactants that may be employed in the practice of the present invention. It will be obvious that many variations may be made within the scope of the disclosure and that the examples are not intended to be in limitation of the present invention.

Example 1

Mixed polyimide: Isopropenyl sebacate, 8 g. (0.0283 mole); N,N'-dimethylazelaamide, 5.78 g. (0.0283 mole); and p-toluenesulfonic acid monohydrate, 25 mg.; were melted together at 190° C. The melt was mechanically stirred for thirty minutes to assist in the release of the liberated acetone vapor. The mixture became very viscous during the later stages. At the end of the reaction the mixture was briefly subjected to vacuum, then cooled to room temperature to produce a rubbery gum-like polymer. Structurally the product is considered to be a linear mixed polyimide.

Example 2

Poly-N-methylazelaimide: Diisopropenyl azelate, 944 mg. (0.00352 mole); N,N'-dimethylzelaamide, 655 mg. (0.00352 mole); and 2.7 mg. of p-toluenesulfonic acid hydrate were melted together and electromagnetically stirred. Effervescence started at 175° C. and the temperature was raised to 190° C. by increasing the rate of heating. After 25 minutes time the reaction flask was briefly held under vacuum and cooled to give a transparent, coherent but non-adherent gum-rubber-like mass.

Example 3

Cross-linked polymer from glycerine and diisopropenyl azelate: Glycerine was dried immediately prior to use. Glycerine, 0.510 g.; diisopropenyl azelate, 2.2229 g.; and 8.3 mg. of p-toluenesulfonic acid were combined and heated to 200–215° C. for 15 minutes while mechanically stirring the mixture. The mixture effervesced as the reaction occurred with evolution of acetone. As the reaction came to completion the mixture rapidly solidified.

Example 4

Cross-linked polymer from sucrose and diisopropenyl sebacate: Sucrose, 0.912 g., diisopropenyl sebacate 3.00 g., and p-toluenesulfonic acid, 22 mg., were placed in a heating bath at 76° C. and rapidly agitated as the temperature was gradually increased. In ten minutes the temperature reached 130° whereupon reaction commenced as evidenced by heavy frothing due to expulsion of acetone vapors. Within five minutes of additional heating to a maximum temperature of 134° C. the mixture set to a heavy gel and finally to a pale yellow solid polymer.

Example 5

Linear polymer from 1,4-bis-aminomethyl cyclohexane: A mixture of 0.71 g. of the commercially available diamine (a mixture of cis and trans forms), diisopropenyl sebacate, 2.68 g., and p-toluenesulfonic acid, 10 mg., were heated from 110 to 120° C. while agitating the mixture. At 114° frothing occurred as acetone vapors were expelled and the mixture solidified as polymerization occurred. The reaction required ten minutes to reach the solidification stage.

Example 6

Linear polymer from 1,4-bis-hydroxymethyl cyclohexane and diisopropenyl sebacate: A stirred mixture of commercial 1,4-bis-hydroxymethyl cyclohexane (cis and trans forms), 1.872 g., diisopropenyl sebacate, 3.675 g., and p-toluenesulfonic acid was placed in a heating bath at 170°. Within three minutes a vigorous expulsion of acetone vapors took place. The mixture quickly became viscid but heating was continued for an additional 30 minutes. The linear polymer prepared under these conditions had a molecular weight of about 2000 grams per mole.

I claim:

1. A process for preparing a condensation polymer which comprises heating a mixture of N,N'-dimethylazelaamide and a diisopropenyl ester of a saturated aliphatic dicarboxylic acid having from 5 to 10 carbon atoms at a temperature up to about 200° C. in the presence of a catalytic amount of an acid selected from the group consisting of p-toluenesulfonic acid and methanesulfonic acid until the condensation reaction is substantially complete.

2. The process of claim 1 in which the diisopropenyl ester is diisopropenyl azelate.

3. The process of claim 1 in which the diisopropenyl ester is diisopropenyl sebacate.

References Cited by the Examiner

UNITED STATES PATENTS

| | | | |
|---|---|---|---|
| 2,901,466 | 8/1959 | Kibler et al. | 260—75 |
| 2,926,174 | 2/1960 | Linn | 260—75 |
| 2,985,628 | 5/1961 | Caldwell et al. | 260—75 |
| 3,213,065 | 10/1965 | Bunge et al. | 260—75 |

SAMUEL H. BLECH, *Primary Examiner.*

WILLIAM H. SHORT, *Examiner.*

R. T. LYON, *Assistant Examiner.*